(12) United States Patent
Li et al.

(10) Patent No.: US 12,380,702 B2
(45) Date of Patent: Aug. 5, 2025

(54) METHOD AND SYSTEM FOR VIDEO STREAM TIME CORRECTION AND LATENCY DETECTION

(71) Applicant: GM Global Technology Operations LLC, Detroit, MI (US)

(72) Inventors: Chuan Li, Troy, MI (US); Andrew W. Averhart, Redford, MI (US); Adam Slifco, Farmington Hills, MI (US); Jace C. Stokes, Highland, MI (US); Max Hoglund, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 190 days.

(21) Appl. No.: 18/350,479

(22) Filed: Jul. 11, 2023

(65) Prior Publication Data

US 2025/0022279 A1    Jan. 16, 2025

(51) Int. Cl.
*G06V 20/56* (2022.01)
*G06V 10/25* (2022.01)

(52) U.S. Cl.
CPC .............. *G06V 20/56* (2022.01); *G06V 10/25* (2022.01)

(58) Field of Classification Search
CPC .......... G06T 2207/30248; G06V 20/56; G06V 10/25

USPC .......................................................... 348/148
See application file for complete search history.

(56) References Cited

U.S. PATENT DOCUMENTS

2021/0400338 A1    12/2021  Verger et al.
2022/0385886 A1*   12/2022  Thodeti ................. H04N 23/52

FOREIGN PATENT DOCUMENTS

EP            3910937 A1     11/2021

* cited by examiner

*Primary Examiner* — Jeffery A Williams
(74) *Attorney, Agent, or Firm* — Vivacqua Crane, PLLC

(57) ABSTRACT

A method for video streaming includes receiving video streaming data from a wireless camera. The camera is in wireless communication with a vehicle. The method further includes identifying a stable video region in the video streaming data received from the wireless camera, detecting stale video content in the video streaming data based on the stable video region, and in response to detecting the stale video content in the video streaming data, providing a notification to a vehicle occupant, via a display of the vehicle. The notification is indicative that a video streamed in the display of the vehicle is stale. The method described in this paragraph improves video and vehicle technology by identifying stale video content and notifying the vehicle occupant that the video is stale, thereby preventing the vehicle occupant from relying on stale video content.

17 Claims, 2 Drawing Sheets

METHOD AND SYSTEM FOR VIDEO STREAM TIME CORRECTION AND LATENCY DETECTION

INTRODUCTION

The present disclosure relates to systems and methods for video stream time correction and latency detection.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Wireless cameras sometimes stream video and audio to a display in a vehicle. However, in-vehicle wireless camera stream may be delayed. To address this delay, it is desirable to accurately calculate the frame-level latency. It is however quite challenging to accurately calculate the frame-level latency without the camera manufacturer's support. Incorrect frame-level representation may result in video stream playback failure.

SUMMARY

In an aspect of the present disclosure, the method for video streaming includes receiving video streaming data from a wireless camera. The camera is in wireless communication with a vehicle. The method further includes identifying a stable video region in the video streaming data received from the wireless camera, detecting stale video content in the video streaming data based on the stable video region, and in response to detecting the stale video content in the video streaming data, providing a notification to a vehicle occupant, via a display of the vehicle. The notification is indicative that a video streamed in the display of the vehicle is stale. The method described in this paragraph improves video and vehicle technology by identifying stale video content and notifying the vehicle occupant that the video is stale, thereby preventing the vehicle occupant from relying on stale video content.

The method may include conducting a video frame timestamp reconstruction, where conducting the video frame timestamp reconstruction includes determining a video frame presentation time of the video streaming data using a following equation: vpt=1/r, where r is the video framerate and vpt is the video frame presentation time of the video streaming data. Identifying the stable video region in the video streaming data received from the wireless camera includes determining an average of a predetermined number of past keyframe time intervals. Identifying the stable video region in the video streaming data received from the wireless camera includes using a following equations: tnextmax≤tn+μ+ϵ; tnextmin≥tn+μ−ϵ, where $t_{nextmax}$ is a maximum timestamp for a next keyframe arrival time; $t_{nextmin}$ is a minimum timestamp for a next keyframe arrival time $t_n$ is a timestamp of an immediately previous keyframe; μ is the average of the predetermined number of past keyframe time intervals; and ϵ is a threshold value to control stale video content detection sensitivity. The method may include: determining that the next keyframe arrival time is between $t_{nextmax}$ and $t_{nextmin}$; and in response to determining that the next keyframe arrival time is between $t_{nextmax}$ and $t_{nextmin}$, determining that the video streaming data from the wireless camera is being displayed correctly in the display of the vehicle. The notification is indicative that a video streamed in the display of the vehicle is stale. The method may include: determining a current video streaming traffic amount per unit time; determining a video streaming traffic amount per unit time for a stable video; comparing the current video streaming traffic amount per unit time with the video streaming traffic amount per unit time for the stable video to determine whether the current video streaming traffic amount per unit time is less than video streaming traffic amount per unit time for the stable video; and in response to determining that the current video streaming traffic amount per unit time is not less than video streaming traffic amount per unit time for the stable video, determining that the video streaming data from the wireless camera is being displayed correctly in the display of the vehicle.

The present disclosure also describes a tangible, non-transitory, machine-readable medium, including machine-readable instructions, that when executed by a processor, cause the processor to execute the method described above.

The present disclosure also describes a system including a transmitter and a controller in communication with the transmitter. The controller is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
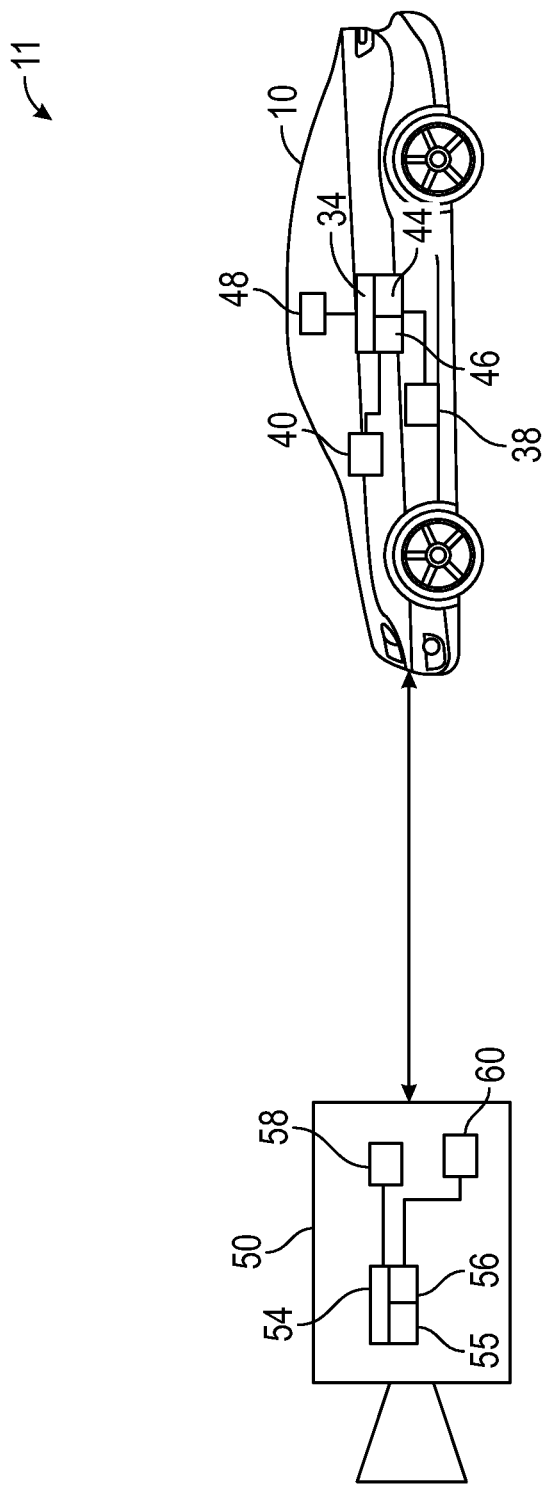
FIG. 1 is a schematic diagram of a system for video streaming.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a system 11 for video streaming includes a vehicle 10 and a wireless camera in communication with the vehicle 10. While the wireless camera 50 is shown outside the vehicle 10, it is contemplated that the wireless camera 50 may be inside of the vehicle 10. Regardless of its location, the wireless camera 50 is in wireless communication with the vehicle 10 through a network, such as the Internet, or using a short-range wireless technology, such as BLUETOOTH or Wi-Fi. Although the vehicle 10 is shown as a sedan, it is envisioned that that vehicle 10 may be another type of vehicle, such as a pickup truck, a coupe, a sport utility vehicle (SUVs), a recreational vehicle (RVs), etc.

The vehicle 10 includes a vehicle controller 34, a receiver 40, and a display 48. The display 48 is in communication with the vehicle controller 34. The display 48 is configured to present images (e.g., video) and may include speakers to emit sound. The receiver 50 is in communication with the vehicle controller 34 and is configured to receive video data wirelessly from the wireless camera 50. The vehicle 10 may additionally include a video decoder 38 (e.g., a hardware-based video decoder) configured to convert base-band video signals to digital video. The video decoder 38 is in communication with the vehicle controller 34.

The vehicle controller 34 includes at least one vehicle processor 44 and a vehicle non-transitory computer readable storage device or media 46. The vehicle processor 44 may be a custom-made processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The vehicle computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the vehicle processor 44 is powered down. The vehicle computer-readable storage device or media 46 of the vehicle controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 34 in controlling the vehicle 10.

The instructions may include one or more separate programs, each of which comprises an ordered listing of executable instructions for implementing logical functions. The instructions, when executed by the vehicle processor 44, receive and process signals from the cameras, perform logic, calculations, methods and/or algorithms for automatically controlling the components of the vehicle 10, and generate control signals to the actuators to automatically control the components of the vehicle 10 based on the logic, calculations, methods, and/or algorithms. Although a single vehicle controller 34 is shown in FIG. 1, the vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the system 11.

The wireless camera 50 is in wireless communication with the vehicle 10 and includes a camera controller 54, a transmitter 58, and a video encoder 60. The transmitter 58 is configured to transmit video data to the vehicle 10 and is in communication with the camera controller 54. The video encoder 60 is in communication with the camera controller 54 and is configured to compress raw digital video to compressed digital video signals.

The camera controller 54 includes at least one camera processor 55 and a camera non-transitory computer readable storage device or media 56. The camera processor 55 may be a custom-made processor, a central processing unit (CPU), a graphics processing unit (GPU), an auxiliary processor among several processors associated with the camera controller 54, a semiconductor-based microprocessor (in the form of a microchip or chip set), a macroprocessor, a combination thereof, or generally a device for executing instructions. The vehicle computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the camera processor 55 is powered down. The camera computer-readable storage device or media 56 of the camera controller 54 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the camera controller 54 in controlling the wireless camera 50. The camera non-transitory computer readable storage device or media 56 includes machine-readable instructions (shown, for example, in FIG. 2), that when executed by the one or more processors, cause the camera processors 55 to execute the method 100 (FIG. 2).

Figure 2:
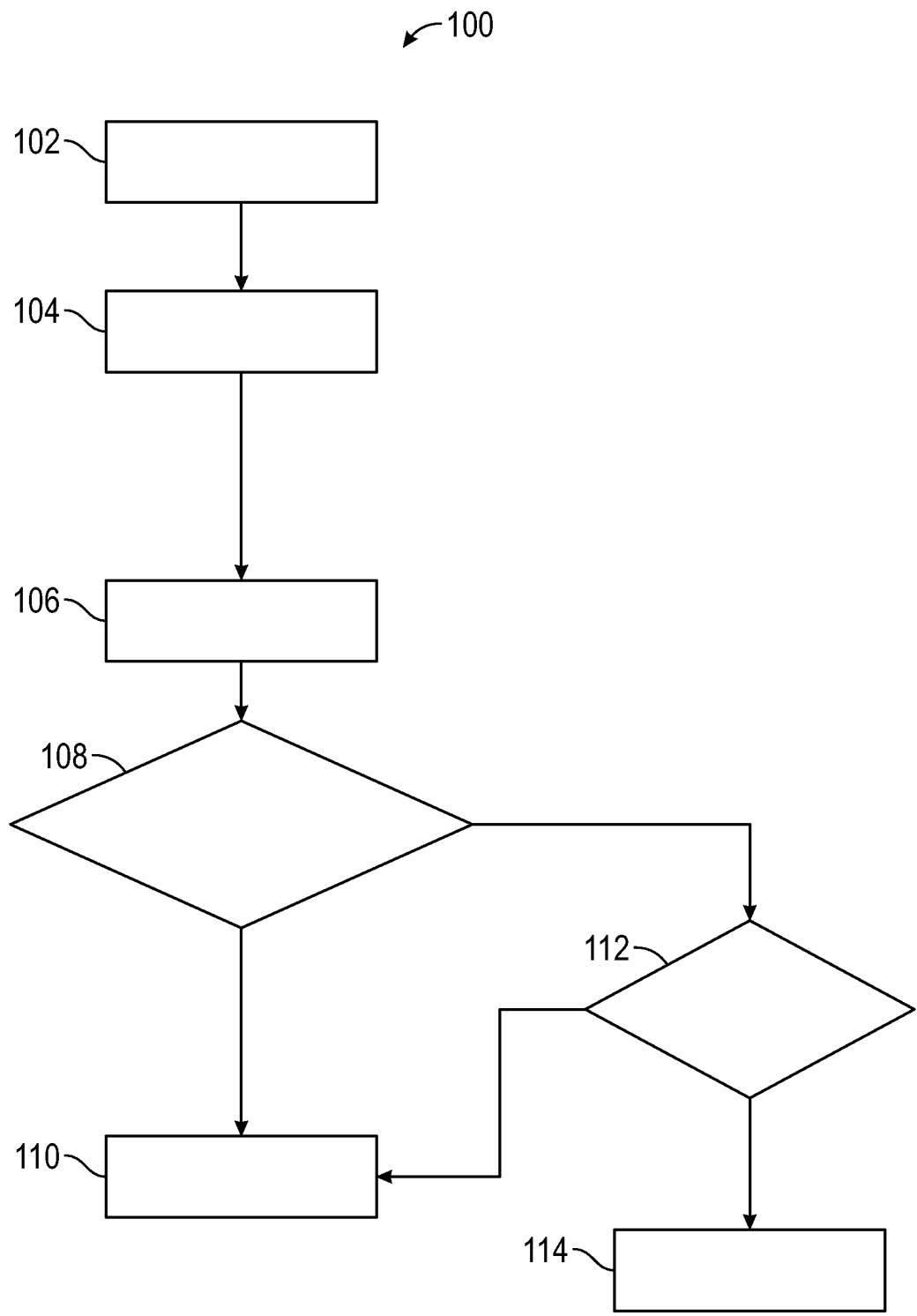
FIG. 2 is a flowchart of a method for video streaming.

FIG. 2 is a method 100 for video steaming. Specifically, the method 100 can be used for video stream time correction and latency detection. The method 100 begins at block 102. At block 102, the vehicle controller 34 receives video streaming data from the wireless camera. As discussed above, the wireless camera 50 is in wireless communication with the vehicle controller 34. Then, the method 100 proceeds to block 104.

At block 104, the vehicle controller 34 conducts a video frame timestamp reconstruction. This step is optional and may be conducted when the video streaming device does not properly set video frame presentation timestamps, such as wireless cameras 50 using the Real-Time Messaging Protocol (RTMP). To conduct the video frame timestamp reconstruction, the video frame presentation time of the video streaming data is determined using the following equation:

$$VPT = 1/R \qquad \text{Eq. 1}$$

where R is the video framerate; and

VPT video frame presentation time.

In this scenario, it is understood that the keyframes have a fixed interval. Also, in the stable video region, the video servers receive a number of frames at the native streaming rate. After determining the video frame presentation time, the method 100 continues to block 106. At block 106, the vehicle controller 34 determines the average of a predetermined number of past keyframe time intervals to identify a stable video region in the video streaming data received from the wireless camera 50. The following equation may be used:

$$\mu = avg(I_1, \ldots, I_n) \qquad \text{Eq. 2}$$

μ is the average of the predetermined number of past keyframe time intervals;

$I_1, \ldots, I_n$ is the predetermined number of predetermined number of past keyframe time intervals;

n is the predetermined number.

After block 106, the method 100 continues to block 108. At block 108, the vehicle controller 34 determines when the next keyframe should arrive. To do so, the vehicle controller 34 may use the following equations:

$$t_{nextmax} \leq t_n + \mu + \epsilon \qquad \text{Eq. 3}$$

$$t_{nextmin} \geq t_n + \mu - \epsilon \qquad \text{Eq. 4}$$

where:

$t_{nextmax}$ is a maximum timestamp for a next keyframe arrival time;

$t_{nextmin}$ is a minimum timestamp for a next keyframe arrival time $t_n$ is a timestamp of an immediately previous keyframe;

$\mu$ is the average of the predetermined number of past keyframe time intervals; and $\epsilon$ is a threshold value to control stale video content detection sensitivity.

If the previous keyframe arrives at timestamp ty, the next keyframe should arrive between $[t_n+\mu-\epsilon, t_n+\mu+\epsilon]$, where $\epsilon$ is a threshold value to control stale video content detection sensitivity. The vehicle controller 34 determines whether the next keyframe arrival time is between $t_{nextmax}$ and $t_{nextmin}$. If the next keyframe arrival time is between $t_{nextmax}$ and $t_{nextmin}$, then the method 100 proceeds to block 110. At block 110, the vehicle controller 34 determines that the video streaming data received from the wireless camera 50 is being displayed correctly (i.e., the video is healthy). If the next keyframe arrival time is not between $t_{nextmax}$ and $t_{nextmin}$, then the method 100 proceeds to block 112.

At block 112, the vehicle controller 34 determines the video streaming traffic amount per unit time for a stable video (which is known based on the initial video streaming data) and the current video streaming traffic amount per unit time. Then, the vehicle controller 34 compares the current video streaming traffic amount per unit time with the video streaming traffic amount per unit time for the stable video to determine whether the current video streaming traffic amount per unit time is less than video streaming traffic amount per unit time for the stable video. If the current video streaming traffic amount per unit time is not less than video streaming traffic amount per unit time for the stable video, then the method 100 proceeds to block 110. As discussed above, at block 110, the vehicle controller 34 determines that the video streaming data received from the wireless camera 40 is being displayed correctly (i.e., the video is healthy). If the current video streaming traffic amount per unit time is less than video streaming traffic amount per unit time for the stable video, then the method 100 proceeds to block 114. At block 114, the vehicle controller 34 determines that that there is stale video content in the video streaming data and, in response, commands the display 48 to provide a notification to the vehicle occupant. The notification is indicative that a video streamed in the display of the vehicle is stale. The notification may be provided via the display 48 and may be provided whenever the video stream delay is greater than a video stream delay threshold. The video stream delay may be determined using the following equation:

$$\Delta T = t' - (t_n + \mu) \qquad \text{Eq. 5}$$

where:

$\Delta T$ is the video stream delay;

$t_n$ is a timestamp of an immediately previous keyframe; and $\mu$ is the average of the predetermined number of past keyframe time intervals.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for video streaming, comprising:
receiving video streaming data from a wireless camera, wherein the wireless camera is in wireless communication with a vehicle;
identifying a stable video region in the video streaming data received from the wireless camera;
detecting stale video content in the video streaming data based on the stable video region;
conducting a video frame timestamp reconstruction, wherein conducting the video frame timestamp reconstruction includes determining a video frame presentation time of the video streaming data using a following equation: VPT=1/R, wherein R is the video framerate and VPT is the video frame presentation time of the video streaming data; and
in response to detecting the stale video content in the video streaming data, providing a notification to a vehicle occupant, via a display of the vehicle, wherein the notification is indicative that a video streamed in the display of the vehicle is stale.

2. The method of claim 1, wherein identifying the stable video region in the video streaming data received from the wireless camera includes determining an average of a predetermined number of past keyframe time intervals.

3. The method of claim 2, wherein identifying the stable video region in the video streaming data received from the wireless camera includes using a following equations:

$$t_{nextmax} \leq t_n + \mu + \epsilon$$

$$t_{nextmin} \geq t_n + \mu - \epsilon$$

$t_{nextmax}$ is a maximum timestamp for a next keyframe arrival time;
$t_{nextmin}$ is a minimum timestamp for a next keyframe arrival time
$t_n$ is a timestamp of an immediately previous keyframe;
$\mu$ is the average of the predetermined number of past keyframe time intervals; and
$\epsilon$ is a threshold value to control stale video content detection sensitivity.

4. The method of claim 3, further comprising:
determining that the next keyframe arrival time is between $t_{nextmax}$ and $t_{nextmin}$; and in response to determining that the next keyframe arrival time is between $t_{nextmax}$ and $t_{nextmin}$, determining that the video streaming data from the wireless camera is being displayed correctly in the display of the vehicle.

5. The method of claim 4, further comprising:
determining a current video streaming traffic amount per unit time;
determining a video streaming traffic amount per unit time for a stable video;
comparing the current video streaming traffic amount per unit time with the video streaming traffic amount per unit time for the stable video to determine whether the current video streaming traffic amount per unit time is less than video streaming traffic amount per unit time for the stable video; and
in response to determining that the current video streaming traffic amount per unit time is less than video streaming traffic amount per unit time for the stable video, providing the notification to the vehicle occupant, via the display of the vehicle, wherein the notification is indicative that a video streamed in the display of the vehicle is stale.

6. The method of claim 5, further comprising:
determining a current video streaming traffic amount per unit time;
determining a video streaming traffic amount per unit time for a stable video;
comparing the current video streaming traffic amount per unit time with the video streaming traffic amount per unit time for the stable video to determine whether the current video streaming traffic amount per unit time is less than video streaming traffic amount per unit time for the stable video; and
in response to determining that the current video streaming traffic amount per unit time is not less than video streaming traffic amount per unit time for the stable video, determining that the video streaming data from the wireless camera is being displayed correctly in the display of the vehicle.

7. A tangible, non-transitory, machine-readable medium, comprising machine-readable instructions, that when executed by a processor, cause the processor to:
receive video streaming data from a wireless camera, wherein the wireless camera is in wireless communication with a vehicle;
identify a stable video region in the video streaming data received from the wireless camera;
detect stale video content in the video streaming data based on the stable video region;
conduct a video frame timestamp reconstruction, wherein conducting the video frame timestamp reconstruction includes determining a video frame presentation time of the video streaming data using a following equation: VPT=1/R, wherein R is the video framerate and VPT is the video frame presentation time of the video streaming data; and
in response to detecting the stale video content in the video streaming data, provide a notification to a vehicle occupant, via a display of the vehicle, wherein the notification is indicative that a video streamed in the display of the vehicle is stale.

8. The tangible, non-transitory, machine-readable medium of claim 7, wherein the tangible, non-transitory, machine-readable medium, further comprising machine-readable instructions, that when executed by the processor, causes the processor to:

determine an average of a predetermined number of past keyframe time intervals.

9. The tangible, non-transitory, machine-readable medium of claim 7, wherein the tangible, non-transitory, machine-readable medium, further comprising machine-readable instructions, that when executed by the processor, causes the processor to:
use a following equations:

$$t_{nextmax} \leq t_n + \mu + \epsilon$$
$$t_{nextmin} \geq t_n + \mu - \epsilon$$

$t_{nextmax}$ is a maximum timestamp for a next keyframe arrival time;
$t_{nextmin}$ is a minimum timestamp for a next keyframe arrival time
$t_n$ is a timestamp of an immediately previous keyframe;
$\mu$ is an average of a predetermined number of past keyframe time intervals; and
$\epsilon$ is a threshold value to control stale video content detection sensitivity.

10. The tangible, non-transitory, machine-readable medium of claim 9, wherein the tangible, non-transitory, machine-readable medium, further comprising machine-readable instructions, that when executed by the processor, causes the processor to:
determine that the next keyframe arrival time is between $t_{nextmax}$ and $t_{nextmin}$; and
in response to determining that the next keyframe arrival time is between $t_{nextmax}$ and $t_{nextmin}$, determine that the video streaming data from the wireless camera is being displayed correctly in the display of the vehicle.

11. The tangible, non-transitory, machine-readable medium of claim 7, wherein the tangible, non-transitory, machine-readable medium, further comprising machine-readable instructions, that when executed by the processor, causes the processor to:
determine a current video streaming traffic amount per unit time;
determine a video streaming traffic amount per unit time for a stable video;
compare the current video streaming traffic amount per unit time with the video streaming traffic amount per unit time for the stable video to determine whether the current video streaming traffic amount per unit time is less than video streaming traffic amount per unit time for the stable video; and
in response to determining that the current video streaming traffic amount per unit time is less than video streaming traffic amount per unit time for the stable video, provide the notification to the vehicle occupant, via the display of the vehicle, wherein the notification is indicative that a video streamed in the display of the vehicle is stale.

12. The tangible, non-transitory, machine-readable medium of claim 7, wherein the tangible, non-transitory, machine-readable medium, further comprising machine-readable instructions, that when executed by the processor, causes the processor to:
determine a current video streaming traffic amount per unit time;
determine a video streaming traffic amount per unit time for a stable video;
compare the current video streaming traffic amount per unit time with the video streaming traffic amount per unit time for the stable video to determine whether the current video streaming traffic amount per unit time is less than video streaming traffic amount per unit time for the stable video; and
in response to determining that the current video streaming traffic amount per unit time is not less than video streaming traffic amount per unit time for the stable video, determine that the video streaming data from the wireless camera is being displayed correctly in the display of the vehicle.

13. A system, comprising:
a wireless camera;
a vehicle including a vehicle controller, wherein the vehicle controller is in wireless communication with the wireless camera, and the vehicle controller is programmed to:
receive video streaming data from a wireless camera, wherein the wireless camera is in wireless communication with a vehicle;
identify a stable video region in the video streaming data received from the wireless camera;
detect stale video content in the video streaming data based on the stable video region;
conduct a video frame timestamp reconstruction, wherein conducting the video frame timestamp reconstruction includes determining a video frame presentation time of the video streaming data using a following equation: VPT=1/R, wherein R is the video framerate and VPT is the video frame presentation time of the video streaming data; and
in response to detecting the stale video content in the video streaming data, provide a notification to a vehicle occupant, via a display of the vehicle, wherein the notification is indicative that a video streamed in the display of the vehicle is stale.

14. The system of claim 13, wherein the vehicle controller is programmed to:
determine an average of a predetermined number of past keyframe time intervals.

15. The system of claim 13, wherein the vehicle controller is programmed to use the following equations:

$$t_{nextmax} \leq t_n + \mu + \varepsilon$$
$$t_{nextmin} \geq t_n + \mu - \varepsilon$$

$t_{nextmax}$ is a maximum timestamp for a next keyframe arrival time;
$t_{nextmin}$ is a minimum timestamp for a next keyframe arrival time
$t_n$ is a timestamp of an immediately previous keyframe;
$\mu$ is an average of a predetermined number of past keyframe time intervals; and
$\epsilon$ is a threshold value to control stale video content detection sensitivity.

16. The system of claim 15, wherein the vehicle controller is programmed to:
determine that the next keyframe arrival time is between $t_{nextmax}$ and $t_{nextmin}$; and
in response to determining that the next keyframe arrival time is between $t_{nextmax}$ and $t_{nextmin}$, determine that the video streaming data from the wireless camera is being displayed correctly in the display of the vehicle.

17. The system of claim 13, wherein the vehicle controller is programmed to:
- determine a video streaming traffic amount per unit time for a stable video;
- compare a current video streaming traffic amount per unit time with the video streaming traffic amount per unit time for the stable video to determine whether the current video streaming traffic amount per unit time is less than video streaming traffic amount per unit time for the stable video; and
- in response to determining that the current video streaming traffic amount per unit time is less than video streaming traffic amount per unit time for the stable video, provide the notification to the vehicle occupant, via the display of the vehicle, wherein the notification is indicative that a video streamed in the display of the vehicle is stale.

* * * * *